June 18, 1957  B. C. MUZZEY  2,795,957

MULTIPLE DERIVATIVE INSTRUMENTS

Filed Sept. 13, 1955

INVENTOR.
BENJAMIN C. MUZZEY
BY
Reynolds, Beach & Christensen
ATTORNEYS

United States Patent Office 2,795,957
Patented June 18, 1957

2,795,957
MULTIPLE DERIVATIVE INSTRUMENTS

Benjamin C. Muzzey, Mercer Island, Wash., assignor to Boeing Airplane Company, Seattle, Wash., a corporation of Delaware Application September 13, 1955, Serial No. 534,005

16 Claims. (Cl. 74—5.6)

This invention relates to a new type of instrument operable to sense and apply to vehicle steering control apparatus certain angular motion derivatives and linear acceleration of the vehicle in order to impart dynamic stability thereto. The invention is primarily applicable to airplanes and guided missiles but may be also used in other types of vehicles. The novel instrument is herein illustratively described by reference to its presently preferred form utilizing certain features of the rate gyro disclosed and claimed in copending patent application Serial No. 474,648, filed December 13, 1954 by Benjamin C. Muzzey, Heinz Recker and Virgil Jones Sims, Jr. However, it will be recognized that a number of modifications and variations therein may be made without departing from the underlying essential features characterizing the invention.

In the above-cited patent application there is described an improved rate gyro incorporating, in addition to the gimbal assembly as such, a separate gyratory mass which is subject to gyration relative to the instrument case when the latter is subjected to angular acceleration about the gimbal axis, said mass having a predetermined moment of inertia about the gimbal axis (or an axis parallel thereto) and being rotationally coupled to the mass of the gimbal assembly in a manner such that the inertial torque of such mass is exerted on the gimbal assembly oppositely to the latter's own inertial torque. The separate gyratory mass increases the effective moment of inertia of the gimbal assembly with respect to gyroscopic or processional torque and reduces the moment of inertia of the gimbal assembly with respect to angular acceleration of the instrument case about the gimbal axis. The result is an available means for increasing the natural period of the instrument while reducing, even eliminating its sensitivity to angular acceleration about the gimbal axis. With such an instrument it is possible to satisfy the conditions for complete or partial cancellation of sensitivity to angular acceleration about the gimbal axis while establishing any suitable natural frequency or pass-band characteristic, and to accomplish these results with different gimbal spring constants suitable to the design requirements of particular installations. The preferred embodiment of the invention in that case, forming a part of the present invention as herein disclosed employs, as the separate gyratory mass, a body of liquid constrained in a circuit around the gimbal axis or an axis parallel thereto, said liquid mass being counter-rotationally coupled to the gimbal assembly by positive displacement pump means actuated by angular movement of the latter about the gimbal axis, said pump means preferably being in the form of one or more projecting vanes on the gimbal intercepting the gyratory flow path of the liquid. As explained in said patent application, such a rate gyro affords a relatively wide range of independent choice of the pass-band and the cross-coupling coefficients of the instrument, affords greater flexibility in the selection of a transducer for converting processional torque into output signal, and permits reducing or altogether eliminating sensitivity to angular acceleration about the gimbal axis while observing other optimum design requirements of particular installations.

With a rate gyro of that type or of any type heretofore used in directionally controlling the flight of high-speed vehicles such as guided missiles, it is necessary for directional stability to employ feedback consisting of a mixture of vehicle angular motion derivatives and linear acceleration in accordance with the aerodynamics, structural dynamics and the control law of the particular vehicle. In a typical practical case the angular rate signal developed by the precession of a rate gyro is mixed with the information representing the first derivative of such rate and in some cases also the second derivative thereof. Optionally in certain cases feedback representing linear acceleration parallel to the gyro spin axis may also be introduced. In ordinary practice separate feed-back instruments are used in order to sense kinematics of the missile, and their signals mixed together after being passed through electrical filters excluding information in the frequency range not used in the control system, before applying the resultant signal to the directional control apparatus of the missile. The present invention permits incorporating practically in a single instrument having a single transducer all of the means for developing the desired rate and rate derivative feed-back signals required for directional stability control purposes.

A general object of the invention, therefore, is an improved instrument incorporating transducer means which develops the desired signal consisting of a mixture of selected missile motion derivatives for controlling stably the flight of a guided missile or other vehicle. Another object of the invention is such an instrument which is relatively compact in construction and reliable in operation.

In accordance with the invention as herein disclosed, a transducer element float is interposed in the circuit of the gyratory fluid mass for displacement therein against the force of the float recentering spring by an amount directly related to gimbal precession, the transducer float passage being by-passed by a fluid passage incorporating one or more pressure producing elements modifying the movement of the transducer element float in accordance with the desired performance of the instrument. The by-pass passage is capable of carrying most of the circuit flow. A spring-loaded plug therein produces a pressure drop in the by-pass passage proportional to displacement of the gyratory liquid mass and thereby subjects opposite sides of the transducer element float to a differential pressure producing displacement of such float proportionately to gimbal precession, which in turn is a direct function of angular rate of turn about the gyro rate input axis. A porous plug in the by-pass passage develops a pressure drop proportional to velocity of displacement of the gyratory liquid mass, which pressure is superimposed on the displacement pressure as additional pressure and represents the first derivative of vehicle angular rate. A venturi-like passage in the by-pass develops a pressure drop proportional to acceleration of the gyratory liquid mass which in turn is superimposed on the composite pressure acting on the transducer element float and is a direct function of angular jerk or the second derivative of angular rate of the vehicle about the gyro rate input axis. The resultant pressure-induced instantaneous deflection of the transducer element float against its return spring in the by-pass passage may be further modified, if desired, to incorporate a linear acceleration signal by employing a transducer element float which has a greater total volume-to-weight density than that of the liquid. Lacking any specific need for this latter type of output the instrument is preferably made with a transducer float having substantially neutral buoyancy in the liquid.

These and other features, objects and advantages of the invention will become more fully evident from the following description thereof by reference to the accompanying drawings.

Figure 1:
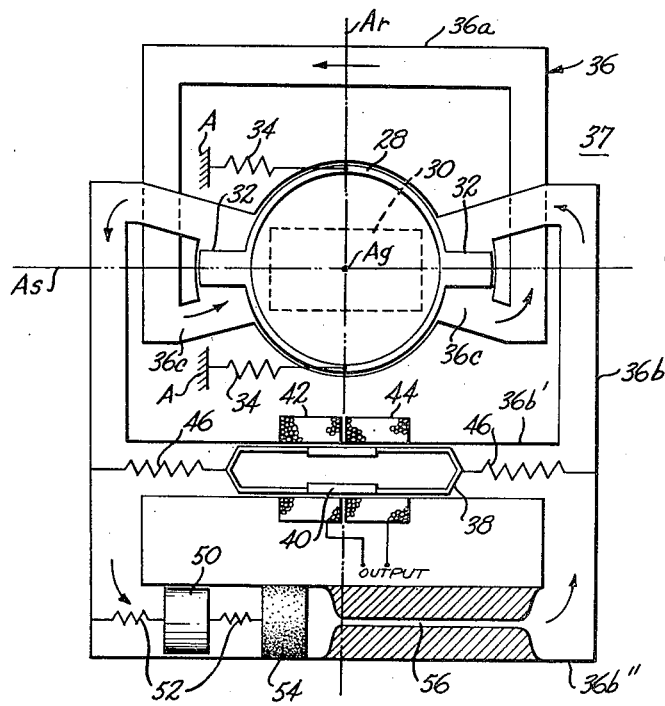
Figure 1 is a schematic diagram illustrating the essential principles of construction and operation of the instrument.

For certain preferred details of construction of a rate gyro instrument suitable for purposes of the present invention reference is made to the above-cited patent application Serial No. 474,648, upon which the present invention constitutes essentially a departure. In Figure 1 herein the three operational axes of the instrument are illustrated in relation to each other and to the instrument base generally designated 37. The angular motion input axis A$r$ is the axis about which angular motion derivatives of the base are to be measured in terms of transducer element deflection. The axis A$g$ is the gimbal axis of the instrument and is perpendicular to the axis A$r$. The axis A$s$ is the spin axis of the gyroscopic element and is perpendicular to the gimbal axis A$g$ and to the angular motion input axis A$r$, as shown. The gimbal assembly is diagrammatically illustrated as comprising the cylindrical member 28, equivalent to the usual gimbal ring, within which the gyroscopic element 30 is suitably mounted and propelled to rotate about the spin axis A$s$. The gimbal assembly further includes the two vanes 32 projecting in an axial diametral plane of the cylindrical member 28 from respectively opposite sides thereof, said plane containing the two axes A$g$ and A$s$. The projecting vanes are assumed to have flat upper and lower surfaces of predetermined area extending in substantially parallel planes perpendicular to the plane of the paper. The gimbal spring is represented in this instance in the form of two helical springs 34 connected at one end to a part of the casing or base as shown by the anchor symbol A, and at their opposite ends to points on respectively opposite sides of the periphery of the gimbal 28 so that the springs, preferably pre-loaded, exert equal and opposite torques on the gimbal assembly in the neutral position of the latter wherein the vanes extend in a horizontal plane, as illustrated. The springs exert progressively increasing net resistance to rotational deflection of the gimbal assembly relative to the instrument case about axis A$g$ in either direction of deflection.

The instrument case 37 incorporates a gyratory flow path or circuit 36 for a mass of liquid contained therein. Said liquid may be a light oil as explained in said copending patent application. This liquid circuit comprises an upper branch 36$a$, a lower branch 36$b$, arcuately formed chambers 36$c$, in which the vanes 32 operate as positive liquid displacement pump vanes, and connecting portions between these chambers and the upper and lower branches of the flow path such that displacement of the vanes by clockwise deflection of the gimbal assembly 28 produces a corresponding but opposite (counterclockwise) displacement of the liquid around the fluid circuit 36, and vice versa. The fluid circuit 36 with its direction-reversing passages leading into the vane chambers 36$c$, as illustrated, is disposed in a plane which may be assumed to be parallel to the plane of the paper, such that the axis of gyration of the liquid is coincident with or parallel to the gimbal axis A$g$. As a result angular acceleration of the instrument case 37 about the gimbal axis A$g$ will tend to result in gyration of the liquid within and relative to the casing. Of course, such gyratory movement of the liquid mass about the circuit 36 tends to occur in the same sense relative to the case as simultaneous gyration of the gimbal assembly 28 relative to the case under the same conditions. However, the net inertial flow pressures developed in the liquid flow path 36 accompanying angular acceleration of the case about axis A$g$ act on opposite surfaces of the vanes 32 in a sense to oppose the inertial torque of the gimbal assembly. By proper choice of the effective area of the vane surfaces subjected to such flow pressures and the average moment arm of the liquid mass about its gyrational axis, substantially complete cancellation of gimbal axis acceleration sensitivity of the instrument is accomplished, or a predetermined reduction of such sensitivity may be achieved in particular designs.

As mentioned in said patent application the circuit passage average cross-sectional area as well as the average radius of gyration or moment arm of the liquid mass about the gyrational axis A$g$ affects the natural frequency of the instrument. It may be shown that the active surface area of the vanes and the average radial distance of the liquid path from the axis of gyration thereof may be chosen to satisfy the condition for eliminating angular acceleration sensitivity of the instrument or for reducing such sensitivity by a predetermined amount, and at the same time, taking also into consideration the average cross-sectional area of the liquid path, achieve a particular natural frequency or pass band in the instrument.

In order to convert precessional deflection of the instrument into a rate output signal in the preferred embodiment a transducer means is used which detects gyratory displacement of the liquid in the circuit 36. For that purpose the liquid circuit lower portion 36$b$ has a transducer passage 36$b'$ in the form of a straight cylindrical section of the path. A float 38 is slidably fitted in the transducer passage 36$b'$, and carries a transducer armature element in the form of a ferromagnetic sleeve 40 centrally mounted on the nonferromagnetic float 38. Differential transformer secondary windings 42 and 44 surround the tubular float passage 36$b'$ in a generally intermediate position lengthwise thereof. In the neutral position of the float 38, established by the transducer return or centering springs 46 connected to opposite ends of the float and to the casing, the transformer core 40 is centered with respect to the two transformer windings as illustrated. This neutral position of the transducer element 40 corresponds to the neutral position of the gimbal assembly 28 as illustrated in the figure. Counterclockwise precessional deflection of the gimbal assembly produces movement to the left of the transducer float 38; clockwise deflection of the gimbal assembly produces reverse movement of the transducer float.

In the rate gyro disclosed and claimed in said copending application the float 38 will faithfully follow gyratory displacement of the liquid mass accompanying changes of input angular rate which occur at a frequency or rate above the lower "break frequency." Below the break frequency the instrument becomes progressively less sensitive to changes in angular rate, i. e. it will not respond to very slow changes in input rate. This low-frequency insensitivity of the instrument arose from any leakage past the float 38 in the transducer passage 36$b'$ and also as a result of flow in a separate passage by-passing the transducer passage.

Most of the liquid flowing in the gyratory circuit 36 flows through the by-pass 36$b''$. Therefore, in order to produce deflection of the transducer element float 38 as a function of precessional deflection of the instrument, it is necessary to establish a resistance to flow through the by-pass 36$b''$ in order to produce a pressure differential as between opposite ends of the transducer passage 36$b'$, which pressure differential, acting against opposite ends of the float, deflects the latter proportionately against its return springs 46. For this purpose the by-pass 36$b''$ has a slidable plug 50 which is deflected in either direction progressively against its return springs 52 as a function of increasing displacement of liquid in the gyratory circuit 36 in one direction or the other. Thus the spring resistance to deflectional force of plug 50 results in the desired pressure differential in the transducer passage 36b' and deflection of the transducer armature 40 substantially in proportion to the net liquid movement or displacement in the circuit 36, as desired.

In order to develop a signal consisting of a mixture of several derivatives of the motion of the supporting vehicle for the purpose of stabilizing said vehicle, it is desirable in accordance with the present invention to incorporate the output information directly in a signal produced by the differential transformer windings 42 and 44. Thus, in accordance with the invention the instantaneous positioning of the transducer armature float 38 is determined not only by position of the liquid in the circuit 36, but also by one or more derivatives of gyratory motion of such liquid, related to angular motion of the vehicle itself about the angular motion input axis Ar.

The first derivative of input angular rate is input angular acceleration of the vehicle, hence of the instrument base 37, about axis Ar, and is measured by the velocity of liquid moving in gyratory path 36. Such velocity is converted into pressure differential applied across transducer passage 36b' by interposing the porous plug 54 in by-pass 36b". This porous plug is designed to present a resistance to flow of liquid through the by-pass 36b" such that the resulting pressure drop across the porous plug is a direct function of flow velocity of the liquid through the by-pass. Thus the resulting pressure differential across transducer passage 36b' includes the algebraic sum of pressures proportional respectively to instantaneous liquid displacement position in circuit 36 and liquid displacement velocity in circuit 36.

A third pressure influencing the instantaneous deflected positioning of float 38 is also developed by incorporating the venturi-like element 56 in the by-pass. The pressure drop across this venturi element is proportional to acceleration of liquid moving in the gyratory path 36, which in turn is directly proportional to the second derivative of angular rate of turn of the vehicle, hence of the instrument base 36, about angular motion input axis Ar.

Well known considerations in the dynamics of liquid flow govern the design of the porous plug 54, the venturi 56 and of the constants of spring 52 in order to achieve the desired composite total pressure determining the instantaneous position of the transducer float 38 for the described purposes.

Still another and optional factor influencing the instantaneous position of the float 38 for stability of directional control of the supporting vehicle is that of linear acceleration of the vehicle in a direction parallel to the gyro spin axis As. Lacking any need for this additional signal, the composite weight-to-volume ratio of the transducer float 38 is preferably made equal to that of the surrounding liquid, so that, kinematically, the float is a neutral body and has no tendency to move in the passage 36b' except when subjected to a pressure differential across the length of such passage. However, in order to modify the instantaneous position of the transducer float in accordance with linear acceleration parallel to axis As, the float is simply made heavier for its volume than the liquid by the necessary amount.

It will be recognized by those familiar with the subject of dynamic controls generally that the requirements of angular control stability in many cases are met with sufficient accuracy if control stabilization is based solely on angular input and the first derivative of angular rate of vehicle motion in relation to the rate input axis Ar. Thus in the majority of cases the spring-returned plug 50 and the porous plug 54, or their respective equivalents, will provide all the necessary dynamic control pressures. In some cases the venturi 56 will be added, and in other cases the float unit 38, 40 will be made more dense than the surrounding liquid in order to incorporate linear acceleration feedback.

Figure 2:
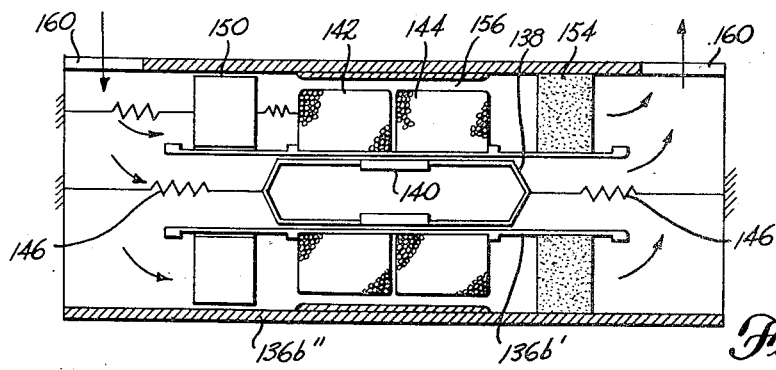
Figure 2 is a schematic diagram illustrating a modified transducer sub-assembly in the form of a cartridge adapted for interpositioning in the flow path of a gyratory liquid mass in order to develop the desired control signals for the vehicle directional flight control apparatus.

Figure 2 illustrates a modification of that portion of the instrument shown in Figure 1 comprising essentially the transducer passage 36b' and the by-pass passage 36b" connected thereto. The arrangement in Figure 2 is intended to comprise an insert cartridge which may be interposed in a liquid flow circuit equivalent to the circuit 36 in the example to replace the apparatus associated with both of the passages just mentioned. In this cartridge the transducer passage 136b' is positioned concentrically within the larger by-pass passage 136b". The differential transformer windings 142 and 144, the transducer element float 138 and armature 140 and the transducer element centering springs 146 associated with the transducer passage tube 136b' may be constructed and arranged similarly to the corresponding components in the preceding form. In this case the rate metering plug 150 received in the annular space between the two tubes 136b' and 136b" is, of course, annular in form, as is the rate derivative porous plug 154. The annular space surrounding the transducer coils 142 and 144 may be used if desired to form the venturi 156. Openings 160 at opposite ends of the larger tube 136b" are furnished for ingress and egress of liquid subject to gyratory flow in the instrument circuit 36 as in the preceding example. This particular arrangement is more compact and has certain advantages from the standpoint of construction over the first-described form. Its operational characteristics are similar.

Having described the invention by reference to the presently preferred form thereof as applied to the altered liquid form of the basic rate gyro disclosed and claimed in the above cited patent application it will be recognized by those skilled in the art that the invention is not limited to the details of illustration but has a scope commensurate with the coverage of the appended claims.

I claim as my invention:

1. A gyro instrument comprising a base adapted to be mounted on a support subject to turning about an angular motion input axis at a rate to be measured by the instrument, a gimbal assembly including gimbal means pivotally mounted on said base for precessional deflection relative thereto about a gimbal axis substantially perpendicular to said input axis, said gimbal assembly including a gyroscopic means carried by said gimbal means and rotatable therein about a gyroscopic spin axis fixedly disposed substantially perpendicular to said gimbal axis, said gimbal means being normally positioned with said spin axis disposed substantially perpendicular to said input axis, antiprecession means yieldably restraining said gimbal assembly against precessional deflection thereof about the gimbal axis with a restraining force increasing progressively with such deflection from a normal position of said gimbal assembly, a gyratory mass of liquid, means on said base encasing said liquid in a substantially continuous gyratory liquid circuit extending around a gyrational axis disposed substantially parallel to said gimbal axis, means counterrotationally coupling said gyratory liquid mass to said gimbal assembly to exert the inertial torque of said gyratory liquid mass compensatively against the inertial torque of the gimbal assembly, both caused by angular acceleration of said instrument base about said gimbal axis, said liquid circuit having a transducer passage therein, a transducer element slidable lengthwise in said passage by liquid displacement therein, transducer element centering means yieldably opposing such displacement of said transducer element from an initial position in said passage, said liquid circuit further having a by-pass passage of large cross section relative to said transducer passage, and connected in by-pass relation to said transducer passage, means in said by-pass passage displaceable progressively by displacement of liquid therein, means opposing displacement of said latter means with progressively increasing force as a function of such displacement, thereby to subject said transducer passage to a progressively increasing pressure differential producing corresponding displacement of said transducer element in said transducer passage, and means in said by-pass passage resisting flow of liquid therein approximately in proportion to velocity of such flow, thereby to modify said pressure differential as a function of velocity of liquid flow in said circuit, hence of angular acceleration of said instrument base about said input axis.

2. The instrument defined in claim 1, and means in said by-pass passage resisting flow of liquid therein approximately in proportion to acceleration of such flow, thereby to modify further said pressure differential as a function of acceleration of liquid flow in said circuit, hence of the first derivative of angular acceleration of said instrument base about said input axis.

3. The instrument defined in claim 2, wherein the means in the by-pass passage resisting flow proportionately to velocity of such flow comprises a porous plug, and the means in the by-pass passage resisting flow proportionately to acceleration of such flow comprises a venturi-like element.

4. The instrument defined in claim 1, wherein the last-mentioned means in the by-pass passage comprises a porous plug.

5. The instrument defined in claim 1, wherein the transducer element has a weight-to-volume ratio materially exceeding that of the liquid, and the transducer passage extends substantially parallel to the gyro spin axis, thereby to subject said transducer element to a positioning force directly related to linear acceleration of the base parallel to such spin axis.

6. A gyro instrument comprising an instrument base adapted to be mounted on a support subject to turning about an angular motion input axis at a rate to be measured by the instrument, a gimbal assembly including gimbal means pivotally mounted on said base for precessional deflection relative thereto about a gimbal axis substantially perpendicular to said input axis, said gimbal assembly including a gyroscopic means carried by said gimbal means and rotatable therein about a gyroscopic spin axis fixedly disposed substantially perpendicular to said gimbal axis, said gimbal means being normally positioned with said spin axis disposed substantially perpendicular to said input axis, anti-precession means yieldably restraining said gimbal assembly against precessional deflection thereof about the gimbal axis with a restraining force increasing progressively with such deflection from a normal position of said gimbal assembly, a gyratory mass of liquid, means on said base encasing said liquid in a substantially continuous gyratory liquid circuit extending around a gyrational axis disposed substantially parallel to said gimbal axis, means counter-rotationally coupling said gyratory liquid mass to said gimbal assembly to exert the inertial torque of said gyratory liquid mass compensatively against the inertial torque of the gimbal assembly, both caused by angular acceleration of said instrument base about said gimbal axis, said liquid circuit having a transducer passage therein, a transducer element slidable lengthwise in said passage by liquid displacement therein, transducer element centering means yieldably opposing such displacement of said transducer element from an initial position in said passage, said liquid circuit further having a by-pass passage of large cross section relative to said transducer passage and connected in by-pass relation to said transducer passage, means in said by-pass passage displaceable progressively by displacement of liquid therein, means opposing displacement of said latter means with progressively increasing force as a function of such displacement, thereby to subject said transducer passage to a progressively increasing pressure differential producing corresponding displacement of said transducer element in said transducer passage, and means in said by-pass passage resisting flow of liquid therein approximately in proportion to acceleration of such flow, thereby to modify said pressure differential as a function of acceleration of liquid flow in said circuit, hence of the first derivative of angular acceleration of said instrument base about said input axis.

7. The instrument defined in claim 6, wherein the last-mentioned means comprises a venturi-like element.

8. A gyro instrument comprising an instrument base adapted to be mounted on a support subject to turning about an angular motion input axis at a rate to be measured by the instrument, a gimbal assembly including gimbal means pivotally mounted on said base for precessional deflection relative thereto about a gimbal axis substantially perpendicular to said input axis, said gimbal assembly including a gyroscopic means carried by said gimbal means and rotatable therein about a gyroscopic spin axis fixedly disposed substantially perpendicular to said input axis, anti-precession means yieldably restraining said gimbal assembly against precessional deflection thereof about the gimbal axis with a restraining force increasing progressively with such deflection from a normal position of said gimbal assembly, a gyratory mass of liquid, means on said base encasing said liquid in a substantially continuous gyratory liquid circuit extending around a gyrational axis disposed substantially parallel to said gimbal axis, means counter-rotationally coupling said gyratory liquid mass to said gimbal assembly to exert the inertial torque of said gyratory liquid mass compensatively against the inertial torque of the gimbal assembly, both caused by angular acceleration of said instrument base about said gimbal axis, said liquid circuit having a transducer passage therein, a transducer element slidable lengthwise in said passage by liquid displacement therein, transducer element centering means yieldably opposing such displacement of said transducer element from an initial position in said passage, said liquid circuit further having a by-pass passage of large cross-section relative to said transverse transducer passage and arranged concentrically thereto, said by-pass passage being connected in by-pass relation to said transducer passage, annular plug means in said by-pass passage displaceable progressively by displacement of liquid therein, spring means opposing displacement of said latter means with progressively increasing force as a function of such displacement, thereby to subject said transducer passage to a progressively increasing pressure differential producing corresponding displacement of said transducer element therein, and annular porous plug means in said by-pass passage resisting flow of liquid therein approximately in proportion to velocity of such flow, thereby to modify said pressure differential as a function of velocity of liquid flow in said circuit, hence of angular acceleration of said instrument base about said input axis.

9. The instrument defined in claim 8, wherein the by-pass passage surrounds the transducer passage, and wherein the transducer element comprises a float longitudinally slidable in said transducer passage and carrying a transducer armature, and a pair of annular coils received in said by-pass passage surrounding said transducer passage in side-by-side relationship, said coils having an outer diameter less than the inside diameter of said by-pass passage to form an annular space surrounding said coils comprising a venturi resisting flow of liquid in said by-pass passage approximately in proportion to acceleration of such flow, thereby to modify said pressure differential as a function of acceleration of liquid in said circuit, hence of the first derivative of acceleration of said instrument base about said input axis.

10. A gyro instrument comprising a base adapted to be mounted upon a support subject to turning about an angular motion axis at a rate to be measured by the instrument, a gimbal assembly including gimbal means pivotally mounted on said base for precessional deflection relative thereto about a gimbal axis substantially perpendicular to said input axis, said gimbal assembly further including a gyroscopic means carried by said gimbal means and rotatable therein about a gyroscopic spin axis fixedly disposed substantially perpendicular to said gimbal axis, said gimbal means being normally positioned with said spin axis disposed substantially perpendicular to said input axis, anti-precession means yieldably restraining said gimbal assembly against precessional deflection thereof about said gimbal axis with a restraining force increasing progressively with such deflection from the normal position of said gimbal assembly, said gimbal assembly having a predetermined moment of inertia about the gimbal axis, a separate gyratory mass constrained relative to said base to gyrate about an axis substantially parallel to the gimbal axis, said gyratory mass having a predetermined moment of inertia about its gyratory axis, means counterrotationally coupling said mass to said gimbal assembly in a manner applying inertial torque of said mass opposingly to inertial torque of said gimbal axis under acceleration of both caused by angular acceleration of said base about said gimbal axis, a transducer element coupled to said separate gyratory mass for deflection of said transducer element caused by precessional deflection of said mass, transducer element centering means yieldably opposing such deflection of said transducer element from an initial position, and means acting on said transducer element and controlled by velocity of gyratory movement of said gyratory mass to increase the deflection of said transducer element as a function of increasing velocity of such gyratory movement, hence of angular acceleration of said base about said input axis.

11. The instrument defined in claim 10, and means acting on the transducer element and controlled by acceleration of gyratory movement of said gyratory mass further to increase the deflection of said transducer element as a function of increasing acceleration of said gyratory mass, hence of the first derivative of acceleration of said base about said rate input axis.

12. A gyro instrument comprising an instrument base adapted to be mounted on a support subject to turning about an angular motion input axis at a rate to be measured by the instrument, a gimbal assembly including gimbal means pivotally mounted on said base for precessional deflection relative thereto about a gimbal axis substantially perpendicular to said input axis, said gimbal assembly including a gyroscopic means carried by said gimbal means and rotatable therein about a gyroscopic spin axis fixedly disposed substantially perpendicular to said gimbal axis, said gimbal means being normally positioned with said spin axis disposed substantially perpendicular to said input axis, anti-precession means yieldably restraining said gimbal assembly against precessional deflection thereof about the gimbal axis with a restraining force increasing progressively with such deflection from a normal position of said gimbal assembly, a mass of liquid, means on said base encasing said liquid in a substantially continuous flow path, means coupling said liquid mass to said gimbal assembly to displace said liquid positively around said flow path in one direction or the other caused by precessional deflection of said gimbal assembly in one direction or the other, said liquid circuit having a transducer passage therein, a transducer element slidable lengthwise in said passage by liquid displacement therein, transducer element centering means yieldably opposing such displacement of said transducer element from an initial position in said passage, said liquid circuit further having a by-pass passage of large cross section relative to said transducer passage and connected in by-pass relation to said transducer passage, means in said by-pass passage displaceable progressively by displacement of liquid therein, means opposing displacement of said latter means with progressively increasing force as a function of such displacement, thereby to subject said transducer passage to a progressively increasing pressure differential producing corresponding displacement of said transducer element in said transducer passage, and means in said by-pass passage resisting flow of liquid therein approximately in proportion to velocity of such flow, thereby to modify said pressure differential as a function of velocity of liquid flow in said circuit, hence of angular acceleration of said instrument base about said input axis.

13. The instrument defined in claim 12, and means in said by-pass passage resisting flow of liquid therein approximately in proportion to acceleration of such flow, thereby to modify further said pressure differential as a function of acceleration of liquid flow in said circuit, hence of the first derivative of angular acceleration of said instrument base about said input axis.

14. The instrument defined in claim 13, wherein the means in the by-pass passage resisting flow proportionately to velocity of such flow comprises a porous plug, and the means in the by-pass passage resisting flow proportionately to acceleration of such flow comprises a venturi-like element.

15. The instrument, defined in claim 12, wherein the last-mentioned means in the by-pass passage comprises a porous plug.

16. The rate gyro defined in claim 12, wherein the transducer element has a weight-to-volume ratio materially different from that of the liquid, and the transducer passage extends substantially parallel to the gyro spin axis, thereby to subject said transducer element to a positioning force directly related to linear acceleration of the base parallel to such spin axis.

References Cited in the file of this patent
UNITED STATES PATENTS

| | | |
|---|---|---|
| 2,290,232 | Fischer | July 21, 1942 |
| 2,426,213 | Herondelle | Aug. 26, 1947 |
| 2,709,921 | Sylvan | June 7, 1955 |